Oct. 25, 1955 W. CASTEDELLO ET AL 2,721,602
SPLICING DEVICE FOR SPLICING PHOTOGRAPHIC FILM
Filed Dec. 24, 1952 2 Sheets-Sheet 1
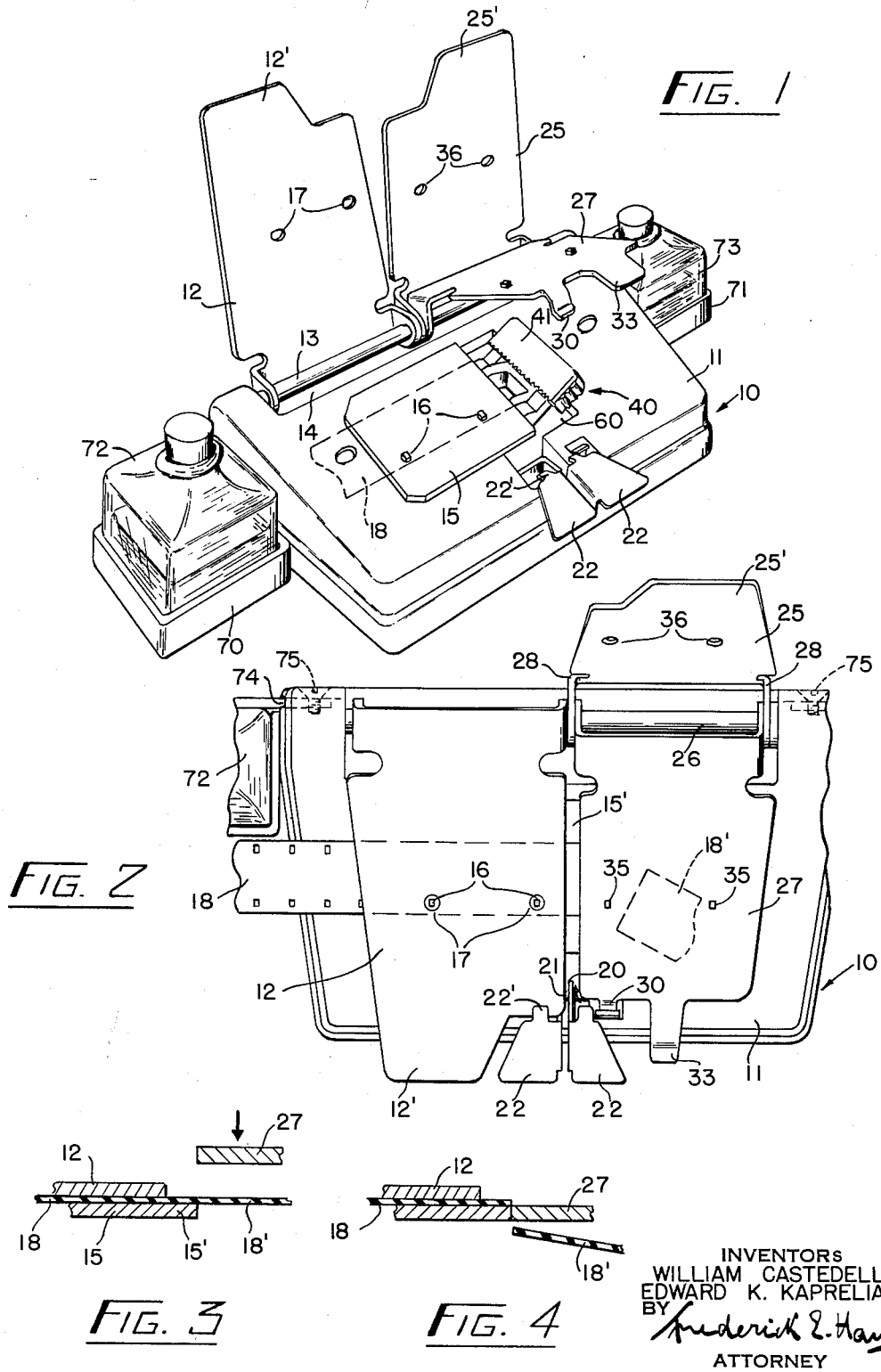
INVENTORS
WILLIAM CASTEDELLO
EDWARD K. KAPRELIAN
BY
ATTORNEY Oct. 25, 1955　　W. CASTEDELLO ET AL　　2,721,602
SPLICING DEVICE FOR SPLICING PHOTOGRAPHIC FILM
Filed Dec. 24, 1952　　2 Sheets-Sheet 2

INVENTORS
WILLIAM CASTEDELLO
EDWARD K. KAPRELIAN
BY
ATTORNEY

United States Patent Office 2,721,602
Patented Oct. 25, 1955

2,721,602

SPLICING DEVICE FOR SPLICING PHOTOGRAPHIC FILM

William Castedello and Edward K. Kaprelian, Plainville, Conn., assignors to The Kalart Company Inc., Plainville, Conn.

Application December 24, 1952, Serial No. 327,893

20 Claims. (Cl. 154—42.1)

The present invention relates to splicing devices for splicing two strips of photographic film, more particularly to splicers for splicing two strips of movie film.

The splicing of two strips of film involves several operations, namely trimming of the edges of the strips to be joined, removal of the emulsion along the margin of the edge of one of the strips, applying adhesive to the marginal edge from which the emulsion has been removed and pressing together the edges of the two strips. To assure a smooth transport of the spliced film through a projector care must be taken that the two strips are spliced with the sprocket holes in registry, the joining line being preferably situated between two frames of the film so that it remains invisible when the film is projected.

While it is possible to perform by hand the aforesaid splicing operations, manual splicing is tedious and frequently not very accurate. Accordingly, various designs of splicing devices have been developed both for professional and amateur use. All these splicer designs comprise clamping means for releasably holding the two strips in proper relative position for splicing, cutting means for trimming the edges of the strips and scraper means for removing the emulsion from the portion of the strip to which the adhesive is to be applied. The present invention is concerned primarily though not exclusively with a splicer designed for amateur use.

One of the objects of the present invention is to provide a novel and improved splicer for splicing two strips of film which permits a performance of the aforedescribed operations in a convenient and accurate manner without requiring an appreciable skill or experience on the part of the operator.

Another object of the invention is to provide a novel and improved splicer so designed that in contrast to splicer designs as hitherto known the scraper is retracted below the working surface of the splicer when the splicer is not in use and also during those of the splicing operations for which the scraper is not required. As a result, the scraper when not in use is protected against damage by impact. The scraper, to serve its purpose, must be movably mounted and be so guided that it will move in accurate parallelism to the plane of the strip portion from which the emulsion is to be removed preparatory to the application of the adhesive as otherwise the emulsion cannot be uniformly scraped off and part of the scraped film portion may be unduly weakened. As will be apparent, any accidental impact—which may easily occur with a splicer design the scraper of which remains above the working surface during the entire splicing operation or while the splicer is stored—will or may bend the scraper out of its correct position. Such danger is avoided by mounting the scraper in accordance with the invention; that is so that the scraper disappears below the working surface of the splicer when not in use. The disappearance of the scraper when not in use below the working surface also greatly improves the overall appearance of the splicer and makes it a more streamlined and compact device.

Another object of the invention is to provide mounting means for the scraper which afford the required freedom of movement of the scraper and which permit a convenient positioning of the scraper during the initial assembly of the splicer and also a later readjustment if required.

Still another object of the invention is to provide guide means for the scraper by which the scraper when used is so guided that the operator can easily move the scraper over and in contact with the entire film surface to be scraped.

Still another object of the invention is to provide improved clamping means for the strip other than the one which is scraped and to which the adhesive is applied. These improved clamping means permit holding the said strip in its proper position relative to the other strip, accurately to press the respective end of the said strip against the adhesive covered end of the other strip and to release the strips from the splicer after the drying of the adhesive without danger of tearing apart the just spliced strip ends.

Still another object of the invention is to associate holding means with the splicer proper for the purpose of placing adhesive and a liquid for softening the emulsion preparatory to the scraping operation within convenient reach of the operator.

Other objects, features and advantages of the invention will be pointed out hereinafter and set forth in the appended claims forming part of the application.

In the accompanying drawing several now preferred embodiments of the invention are shown by way of illustration and not by way of limitation.

In the drawing:

Fig. 1 is a perspective view of a splicer according to the invention including holding means for adhesive and a softening liquid.

Fig. 2 is a fragmentary plan view of Fig. 1, showing the clamping means of the splicer in a position different from the one of Fig. 1.

Figs. 3 and 4 are diagrammatic views of two stages of a splicing operation.

Figure 5:
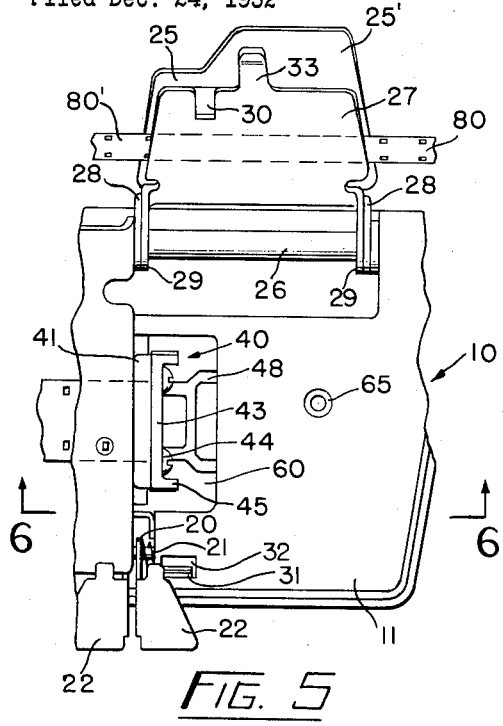
Fig. 5 is a fragmentary plan view similar to Fig. 2 showing the clamping means in still another position.

Referring now to the figures in detail, the illustrated exemplification of a splicer according to the invention comprises a base structure shown as a casing or box generally designated by 10. The top wall member 11 of this casing constitutes the working surface of the splicer and the casing serves to support and house the mechanism of the splicer. It may have any shape suitable for this purpose. Broadly speaking, the left hand half of the splicer (as seen on Fig. 2) serves to receive and manipulate one of the two strips to be spliced and the right hand half the other strip. Accordingly, separate clamping means are provided for each half of the splicer. Referring first to the left hand clamping means, these clamping means are shown as comprising a plate 12 pivoted to casing 10 by any suitable means such as a pivot shaft 13 mounted in a cut-out portion 14 of casing 10. The plate 12 is preferably pivoted or hinged to the casing under friction so that it will remain in any adjusted position and coacts with a plate 15 secured to or integral with the working surface 11. The two plates are disposed in a relative position such that plate 12 can be placed flat upon plate 15. This position of plate 12 is shown on Fig. 2. This figure also shows that a narrow strip 15' of plate 15 protrudes from the right hand edge of plate 12. This strip of plate 15 together with the right hand edge of plate 12 serves to support and to limit the portion of the film which is scraped and to which the adhesive is applied during the splicing operation as will be more fully explained hereinafter. In order to facilitate location of a strip of film on plate 15 this plate is provided with two or more sprocket pins 16 the spacing of which corresponds to the standard spacing of the sprocket holes of a strip of film. Sprocket pins 16 enter correspondingly spaced holes 17 in plate 12 when this plate is placed in the position of Fig. 2. As a result, a strip of film 18 placed between the plates 12 and 15 will be safely held in position between the plates. Furthermore, the location of sprocket pins 16 assures that the splicing line is always between two frames of the film rather than through the middle of a frame as will appear from the subsequent description. The plate 12 is preferably held in the position of Fig. 2 or Fig. 10, which may be referred to as the closed position, by a latch. This latch is shown as comprising a spring loaded lever 20 which is pivoted to casing 11 by means of a pivot pin 21. Lever 20 supports a finger plate 22 which has a projection or nose 22' engageable with plate 12. As can best be seen on Fig. 1, nose 22' is bent downwardly so that plate 12 when pressed into its closed position can pass the finger plate and its nose. After passage of plate 12 the finger plate is snapped forwardly by its spring thereby yieldably retaining plate 12 in its closed position. Yieldable latches, as just described, are well known in the art so that a more detailed description and illustration do not appear to be essential for an understanding of the invention.

The right hand clamping means comprise a plate 25 similar to the plate 12 and also frictionally pivoted to casing 10 by means of a pivot shaft 26. The clamping means further comprise a second plate 27 also frictionally pivoted to shaft 26. The two plates are so disposed that they can be jointly pivoted with their facing surfaces parallel to each other. For this purpose, plate 25 is pivoted to shaft 26 by means of flanges 28 and plate 27 is hinged to shaft 26 by somewhat shorter flanges 29.

Figure 10:
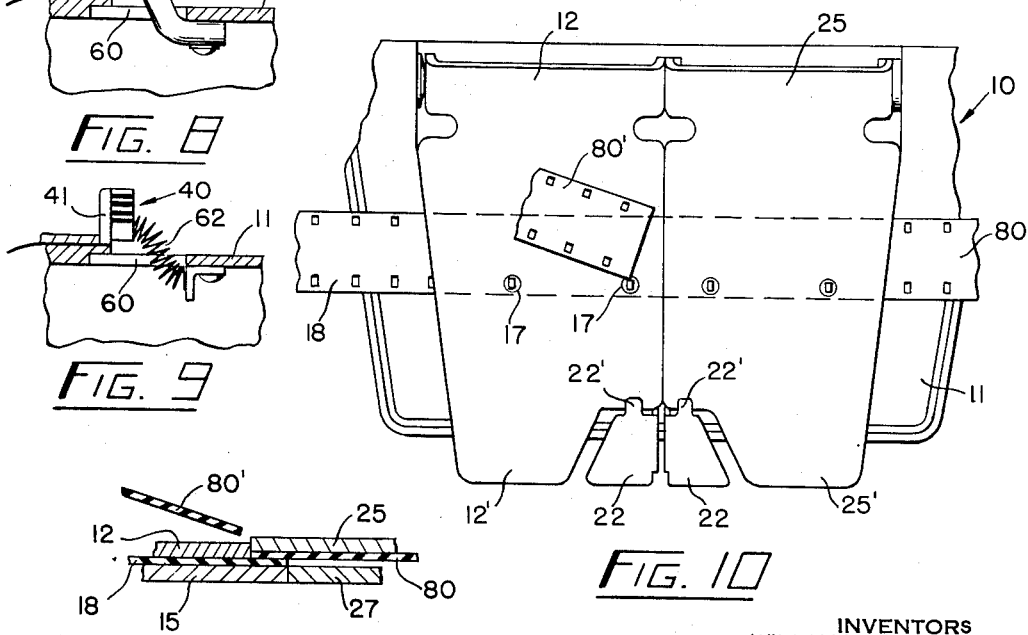
Fig. 10 is a fragmentary plan view similar to Fig. 2 showing still another position of the clamping means.

In the position of plate 27 as shown on Fig. 2 the plate rests upon the working surface 11 in which position the upper surface of plate 27 is flush with the upper surface of plate 15. Plate 25 when placed in its closed position, as shown on Fig. 10, is held in this position by a second yieldable latch as has been described in connection with the latch for plate 12. Plate 27 is retained in the position of Fig. 2 by means of a yieldable detent. This detent is shown as a somewhat springy depending nose 30 engageable with a leaf spring 31 secured to casing 10 below the working surface 11. A slot 32 in the working surface 11 permits engagement between nose 30 and spring 31. To facilitate manipulation of plate 27 the same is provided with a grip 33. Similarly, plates 12 and 25 have portions 12' and 25' respectively which facilitate the manipulation of these plates. As can best be seen on Figs. 5 and 10, the plate portion 25' of plate 25 extends beyond grip 33 of plate 27. The purpose of this arrangement is to permit a convenient lifting of plate 25 after release of this plate by its latch without also lifting plate 27 which is not positively but yieldably attached to the casing.

Plate 27 when resting on working surface 11 abuts closely with its left hand edge against the right hand edge of plate 15. Similarly, the left hand edge of plate 25 abuts closely against the right hand edge of plate 12 when the two plates are in the closed position as shown on Fig. 10. As a result, the closely abutting edges of the plates act as cutters for strips of film placed between the plates of the splicer.

To locate a strip of film between plates 27 and 25, plate 27 is provided with at least two sprocket pins 35 which coact with corresponding holes 36 in plate 25. The sprocket pins and the holes are also spaced corresponding to the spacing of the sprocket holes in the film and are so positioned that a sprocket hole in a strip of film placed upon sprocket pins 35 will be in registry with a sprocket hole in a strip of film resting upon the aforementioned strip 15' of plate 15 protruding from plate 12 when the latter is in its closed position.

The scraping means of the splicer comprise the scraper member proper generally designated by 40 and yieldable support means by means of which the scraper 40 is secured below the working surface 11 of splicer casing 10. To attain the aforementioned objects of the invention the yieldable support means must permit movement of the scraper or more specifically of the scraping surface thereof along and over the entire surface portion of the strip to be scraped and a retraction of the scraper below the level of working surface 11 when clamping plate 27 is in the position of Fig. 2. It is further essential that the support means are mounted on the splicer casing so that the position of scraper 40 relative to the respective surface portions of plates 12 and 15 can be conveniently adjusted during the initial assembly of the splicer and later if required. The scraper is shown as comprising a bar or plate 41 provided on its edge facing plate 15 when the scraper is in operative position with a scraping surface 42 which may be in the nature of the surface of a file. The yieldable support means for the scraper bar 41 comprises a bracket 43 secured to scraper plate 41 by any suitable means such as screws 44. This bracket is formed with flanges 45 which are preferably knurled or milled as is shown at 46 to facilitate manipulation of the scraper plate. As will be apparent, the scraper plate 41 could also be designed as an integral part of bracket 43. The bracket is pivoted by means of a pivot pin 47 to an arm 48 which in turn is pivotally supported on the lower side of working surface or wall 11 by means of brackets 49 and a pivot pin 50. A leaf spring 51 fastened to arm 48 by a screw 52 and coacting with the bottom side of casing wall 11 biases arm 48 into a position in which scraper plate 41 is above the level of working surface 11. This position of the scraper plate can best be seen on Figs. 1 and 6. Arm 48 is axially slidable on pivot pin 50 and is biased toward the center position shown on Fig. 7 by two springs 53 and 54 respectively. These springs are sufficiently weak and loosely wound to permit an axial displacement of arm 48 and with it of scraper plate 41 in either direction sufficient to move the scraper plate over the entire width of plate 15. Brackets 49 supporting pivot pin 50 and with it the entire scraper assembly are mounted on wall 11 by means of a plate 55. The plate is fastened to wall 11 by elongated screw holes 56 and screws 57. Screw holes 56 being elongated permit an adjustment of the entire scraper assembly.

It will be apparent from the previous description that the yieldable support means permit a straight movement of the scraper plate transversely to the width of plate 15, a pivotal movement about pivot pin 47 and a second movement about pivot pin 50 and that the scraper plate is yieldably biased into a position above the level of the working surface 11 which for this purpose is provided with an opening 60.

Figure 8:
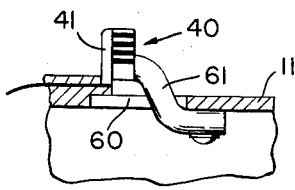
Fig. 8 is a fragmentary sectional view of a modification of the scraper support.

Fig. 8 shows an arrangement in which the scraper 40 is secured to the lower side of wall member 11 by means of a flexible member 61 which may be visualized as a rubber plate or arm. This rubber arm is so shaped that it biases the scraper into the position shown on Fig. 8 and permits retraction of the scraper below the level of wall 11. Rubber arm 61 may be secured to scraper 40 and wall 11 by any suitable means.

Figure 9:
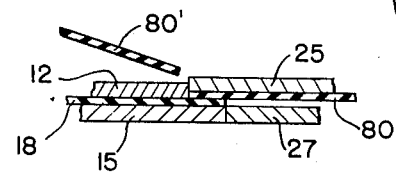
Fig. 9 is a similar fragmentary sectional view showing another modification of the scraper support.

Fig. 9 shows an arrangement in which the scraper 40 is yieldably supported by a coil spring 62. One end of this spring is also fastened to the lower side of wall 11 and the spring is so biased that it urges the scraper into its working position above the level of wall 11.

Figure 6:
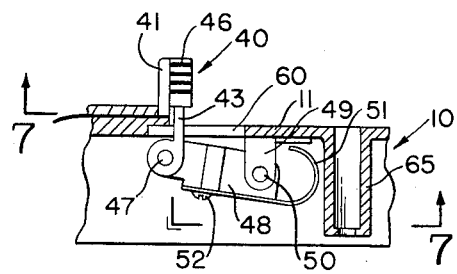
Fig. 6 is a fragmentary sectional view taken on line 6—6 of Fig. 5.
Figure 7:
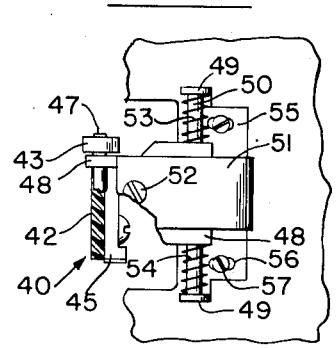
Fig. 7 is a fragmentary sectional view taken on line 7—7 of Fig. 6.

As will be apparent, the flexible members 61 and 62 permit movements of the scraper similar to those provided by the yieldable support means described in connection with Figs. 5, 6 and 7.

The splicer may be used by placing casing 10 upon a suitable support such as a table but generally it is preferable to secure the splicer casing to a base plate. For this purpose the casing is provided with several hollow posts 65 through which screws may be screwed into a base plate.

As previously mentioned, the splicing operation involves the use of an adhesive such as a suitable cement and in some cases the use of water or other suitable liquid for the purpose of softening the emulsion prior to the scraping thereof may be found convenient. As can best be seen on Figs. 1 and 2, two brackets 70 and 71 are attached to splicer casing 10. These brackets serve to accommodate bottles 72 and 73 respectively for cement and water. The two brackets are shown as being formed by a bent strip of metal which is fastened to the splicer casing preferably by slots 74 formed in the casing. The bracket forming strips are fitted in these slots and secured therein by a screw 75. It will be apparent that while square-shaped brackets and square-shaped bottles are shown the brackets may also be shaped to accommodate round bottles.

Figure 11:
Fig. 11 is a diagrammatic view similar to Figs. 3 and 4 showing still another stage of a splicing operation.

Let it be assumed that it is desired to splice two strips of film by means of a splicer according to the invention. The several operations involved in such splicing of a film will now be described step by step with particular reference to Figs. 3, 4 and 11.

As the first step, strip 18 is placed upon the sprocket pins 16 of plate 15 in a position such that its portion 18' protrudes beyond the right hand edge of plate 15. As previously explained, the spacing of the sprocket pins is such that the portion 18' of strip 18 which rests upon the right hand portion 15' of plate 15 includes a dividing line between two frames and hence also sprocket holes, the sprocket holes in a film being conventionally placed in alignment with the dividing line between two frames. The next step is to press plate 12 down upon strip 18 until nose 22' of the respective finger plate 22 snaps over plate 12. The respective parts of the splicer are now in the position shown on Fig. 3. The next step is to press plate 27 against wall 11 of the splicer casing. As a result, the protruding portion 18' is cut off by the coacting sharp edges of plates 15 and 27. This step of the operations is shown on Fig. 4 (see also Fig. 2). Plate 27 is now lifted and the second strip 80 is fitted upon sprocket pins 35 of plate 27 so that portion 80' of strip 80 protrudes from the left hand edge of plate 27 and the two plates 27 and 25 are folded against each other, as is indicated on Fig. 5, thereby clamping the second strip of film in position. The positioning of the sprocket pins on plate 27 again assures that the part of the protruding strip portion 80' which corresponds in position to the part of strip portion 18' resting upon plate portion 15' includes a dividing line between two frames and sprocket holes.

As will be apparent from the previous description, lifting of plate 27 causes the spring biased scraper 41 to move into its position above wall 11 as can best be seen on Fig. 1. The operator now grips the scraper and rubs the same back and forth over the strip portion resting upon plate portion 15' until the emulsion is removed from this strip portion. If desired, water or another softening agent may be applied to the emulsion prior to the scraping operation to facilitate the removal of the emulsion. As will be apparent, the operator is compelled to move the scraper uniformly and in a straight line over the strip portion to be scraped as the previously described mounting of the scraper does not permit a tilting of the same. Furthermore, the right hand edge of plate 12 acts as a guide for the scraper so that the operator by pressing the scraper against the said edge can conveniently assure a uniform scraping of the entire strip portion to be scraped. After the completion of the scraping operation, the operator simply releases the scraper which by its own weight will move into the backwardly tilted position shown on Fig. 1 thereby providing space for the next operational step. This step consists in applying adhesive such as cement which may be taken from the respective bottle 72 and 73 to the scraped strip portion. Thereupon the plates 27 and 25 are pressed jointly upon wall member 11 until the detent nose 30 of plate 27 is caught by spring 31 and plate 25 by nose 22' of the respective finger plate 22. As a result, the coacting edges of plates 12 and 25 cut or shear off the protruding film portion 80' and the respective portion 80' of strip 80 is pressed against the cement covered portion 18' of strip 18 as is shown on Fig. 11. Furthermore, the pressure of plate 27 forces the scraper 41 automatically into its position below the level of wall 11. After a period of time sufficient to permit drying of the cement, plates 12 and 25 are lifted and the spliced film can now be removed from the splicer. As will be observed, the positioning of plate portion 25' and grip 33 of plate 27 assure that plate 25 can be lifted, after release of its latch, without any danger of simultaneously lifting plate 27. It will be evident that a lifting of plate 27 jointly with plate 25 would tear apart the just spliced strips of film.

The hereinbefore described sequence of operations is generally the most convenient one but it will be obvious that a certain departure from the described sequence is quite possible, for instance strip 80 may be fitted between plates 25 and 27 prior to the placement of strip 18 between plates 12 and 15.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. In a splicing device for splicing two strips of photographic film including a wall member forming a working surface and clamping means for clamping the strips of film upon said working surface in position for splicing, scraping means comprising a scraping member for scraping the emulsion from a portion of one of said strips to be spliced, and yieldable support means supporting said scraping member, the said support means being secured to said splicing device below said working surface and yieldably biasing the scraping member from a position below the working surface into a position above said working surface, said latter position being the operative position of the scraping member.

2. In a splicing device for splicing two strips of photographic film including a wall member forming a working surface and clamping means for clamping the strips of film upon said working surface in position for splicing, scraping means comprising a scraping member for scraping the emulsion from a portion of one of said strips to be spliced, and yieldable support means supporting said scraping member, the said support means being secured to said splicing device below said working surface and yieldably biasing the scraping member into a position above said working surface, the said position being the operative position of the scraping member, and the said clamping means being engageable with said scraping member for holding the same flush with said working surface when in said position for clamping the two strips of film upon said working surface.

3. A splicing device according to claim 2, wherein the said wall member is formed with an opening therethrough, the said yieldable support means being mounted on said wall member on the side thereof opposite to the clamping means and positioned so that said yieldably supporting scraping member is movable through said opening between its positions above and flush with said working surface.

4. A splicing device according to claim 3, wherein the said clamping means comprise a clamping plate pivotal into a position substantially flat upon said working surface and covering the opening therethrough thereby pressing the said yieldably supported scraping member into its position flush with said working surface.

5. A splicing device according to claim 2, wherein the said yieldable support means comprise pivotal means mounted below said working surface and supporting the scraping member for pivotal movement between its position above said working surface and its position flush with said surface, spring means biasing the scraping member into its position above said working surface and slidable means mounted below said working surface and supporting the scraping member for a straight reciprocatory movement thereof.

6. A splicing device according to claim 5, wherein the said pivotal support means comprise a linkage means secured with one end to the scraping member and pivotally mounted with the other end on said wall member on the side thereof opposite to said working surface formed thereby, and wherein the said slidable support means comprise a pivot pin pivotally and axially slidably supporting the respective end of the linkage means, and a mounting bracket securing said pivot pin to said side of the wall member opposite to the working surface thereof.

7. A splicing device according to claim 6, wherein the said spring means are in form of a leaf spring secured to said linkage means and engageable with the respective side of the wall member for biasing the scraping member into said position above the working surface.

8. A splicing device according to claim 5, wherein the said pivotal support means comprise a linkage means secured with one end to the scraping member and pivotally mounted with the other end on said wall member on the side thereof opposite to said working surface formed thereby, and wherein said slidable support means comprise a pivot pin pivotally and axially slidably supporting the respective end of the linkage means, and a mounting bracket supporting said pivot pin and adjustably secured to the side of said wall member opposite to the working surface thereof for adjusting the position of the linkage means and hence of the scraping member relative to said working surface.

9. A splicing device for splicing two strips of photographic film by scraping the emulsion from a portion of one strip, applying adhesive to the scraped strip portion and pressing a corresponding portion of the second strip upon the scraped and adhesive covered portion of the first strip, the said device comprising a base structure including a wall member forming a working surface, a first clamping means pivoted to said base structure and movable upon said working surface for clamping the strip to be scraped to said surface in a position exposing the strip portion to be scraped, a second clamping means pivoted to said base structure and movable upon the working surface for clamping the second surface in a position in which a corresponding portion of the second strip is pressed against a scraped strip portion in the position for splicing, the said wall member including an opening situated below the portion of the working surface coacting with the second clamping means, scraping means comprising a scraping member fitting through said opening, and yieldable support means for said scraping member extending through said opening and secured to the base structure below said working surface, the said yieldable support means biasing the scraping member into a position above said working surface so that the scraping member is adapted to perform a scraping operation, and the said second clamping means, when in the said clamping position, holding the scraping member within said opening in a position substantially flush with said working surface.

10. A splicing device according to claim 9, wherein the said yieldable support means comprise a linkage means providing for a pivotal movement of the scraping member relative to said wall member within and through the opening thereof, and mounting means slidably supporting said linkage means and providing for a straight reciprocatory movement of the scraping member transversely to a strip of film held by said first clamping means.

11. A splicing device according to claim 10, wherein the said linkage means comprise two pivotally connected arms, the free end of one arm being fixedly secured to said scraping member, and wherein the said mounting means comprise a pivot pin pivotally and axially slidably supporting the free end of the other arm.

12. A splicing device according to claim 11, wherein the said first clamping means comprise a clamping plate fixedly secured upon said working surface and a second clamping plate pivoted to said base structure and coacting with said fixed plate for clamping a strip of film therebetween, a surface portion of said fixed clamping plate laterally protruding from the pivotal plate when said latter plate is in clamping position for forming a support base for the strip portion to be scraped, the respective edge of the pivotal clamping plate defining said support base forming a guide edge for guiding the scraping member during a reciprocatory movement thereof.

13. A splicing device according to claim 12, wherein the said second clamping means comprise two clamping plates pivoted to said base structure separately and jointly movable relative to said working surface for clamping the second strip of film between said clamping plates, latch means for the outer clamping plate for latching the same to the wall member, and yieldable detent means on the inner clamping plate for yieldably retaining the same on the wall member.

14. A splicing device according to claim 13, wherein the said inner clamping plate when resting upon said working surface is substantially flush with said fixed plate of said first clamping means.

15. A splicing device according to claim 14, wherein the said mounting means for the pivot pin comprise brackets adjustably secured to said wall member for adjusting the position of the scraping member movement relative to said guide edge.

16. A splicing device according to claim 9, wherein the said yieldable support means for the scraping member comprise a flexible member secured at one end to said scraping member and at the other end to the base structure below said working surface, the said flexible member extending through said opening and biasing the scraping member into its position above the working surface.

17. In a film splicer having a base and hinged clamping and cutting blades coacting with said base, a scraping means for scraping a film portion preparatory to the splicing thereof, and yieldable support means supporting said scraping means and mounted below the level of said base for movement of the scraping means between a scraping position above said base and an inactive position below the level of said base, the said yieldable support means biasing the scraping means into its position above said base.

18. A film splicer comprising a base, a blade hinged to said base and movable into a position parallel with said base, a scraping means for scraping a film portion preparatory to the splicing thereof, and yieldable support means supporting said scraping means and mounted below the level of said base for movement of the scraping means between a scraping position above said base and an inactive position below the level of said base, the said yieldable support means biasing the scraping means into the position above said base and said blade holding the scraping means in its position below the level of said base upon movement of said blade into its position parallel with the base.

19. A film splicer according to claim 18, wherein the said blade is a cutting blade, and wherein a second blade is hinged to said blade movable into position parallel to the base for clamping the film portion between said second blade and the base preparatory to the cutting and scraping operations.

20. A film splicer according to claim 18, wherein the said base is formed with an opening therethrough, and wherein the said support means are mounted below the base adjacent to said opening, the said scraping means being biased through said opening into its scraping position above the base and held in its position below the base upon placement of said cutting blade into its position parallel to the base.

References Cited in the file of this patent

UNITED STATES PATENTS

| | | |
|---|---|---|
| 2,385,353 | Frankel | Sept. 25, 1945 |
| 2,457,995 | Frankel | Jan. 4, 1949 |
| 2,611,723 | Aboltin | Sept. 23, 1952 |
| 2,611,724 | Wittenberg | Sept. 23, 1952 |